Feb. 14, 1933. E. O. COREY 1,897,791
FORCE FEED LUBRICATOR
Filed Aug. 31, 1928  2 Sheets-Sheet 2

INVENTOR
Elmer O. Corey
BY
ATTORNEYS

Patented Feb. 14, 1933

1,897,791

UNITED STATES PATENT OFFICE

ELMER O. COREY, OF NORWOOD, OHIO, ASSIGNOR TO THE EDNA BRASS MANUFACTURING COMPANY, OF CINCINNATI, OHIO, A CORPORATION OF OHIO

FORCE FEED LUBRICATOR

Application filed August 31, 1928. Serial No. 303,204.

This invention relates to force feed lubricators, power driven, and particularly applicable for locomotive engine service, forcibly delivering measured or regulated quantities of lubricant to the various parts of the engine in pipe connection with the lubricator.

The lubricator is provided with one or more pressure units, the units actuated by a single shaft and preferably in seriatim to avoid undue torque on the shaft. Each unit is organized of a removable fitting secured to the base of the reservoir body and to which a line connection or connections is made, the fitting providing a support for a removable cylinder into which a hollow open ended plunger is engaged.

The plunger in conjunction with a valve controls the admission of the lubricant from the reservoir into the cylinder through the plunger, the valve and plunger operating at relatively variable retreat stroke lengths to open or unseat the valve and govern the plunger displacement, and operate unitarily in a pressure stroke for seating the valve and forcing a definite quantity of lubricant from the cylinder.

An object of the invention is to provide a pressure unit of the character above referred to, of simple and compact arrangement conveniently removable from the lubricator for making repairs or renewals, sturdy in structure, and of increased durability.

Another object of the invention is to provide means freely accessible upon opening the cover of the lubricator body above the oil capacity of the reservoir and clearly visible for making accurate regulation of lubricant discharge by the pump or pressure mechanism, and regulatable while the lubricator is in operation.

Another object of my invention is to provide a sight gage at one or more corners of the lubricator body at an angle to the walls thereof for vision to the full reservoir height and from opposite ends of the lubricator.

Other features and advantages relate to details of lubricator construction and arrangement of parts, as dividing the lubricator body into a reservoir and fill chamber above the reservoir, with strainer openings connecting thereto to allow for lubricant expansion above the reservoir capacity to prevent the lubricant from spilling or oozing out between the cover and body, and to provide check valve control for the head ends of the service piping connecting with the lubricator, so that when the coupling connection of the service line is disconnected from the lubricator the oil will remain in the pipe and not be allowed to discharge, furnishing a saving in oil and reloading of the pipe line when reconnected, all of which will be more fully set forth in the description of the accompanying drawings, in which:

Figure 1:
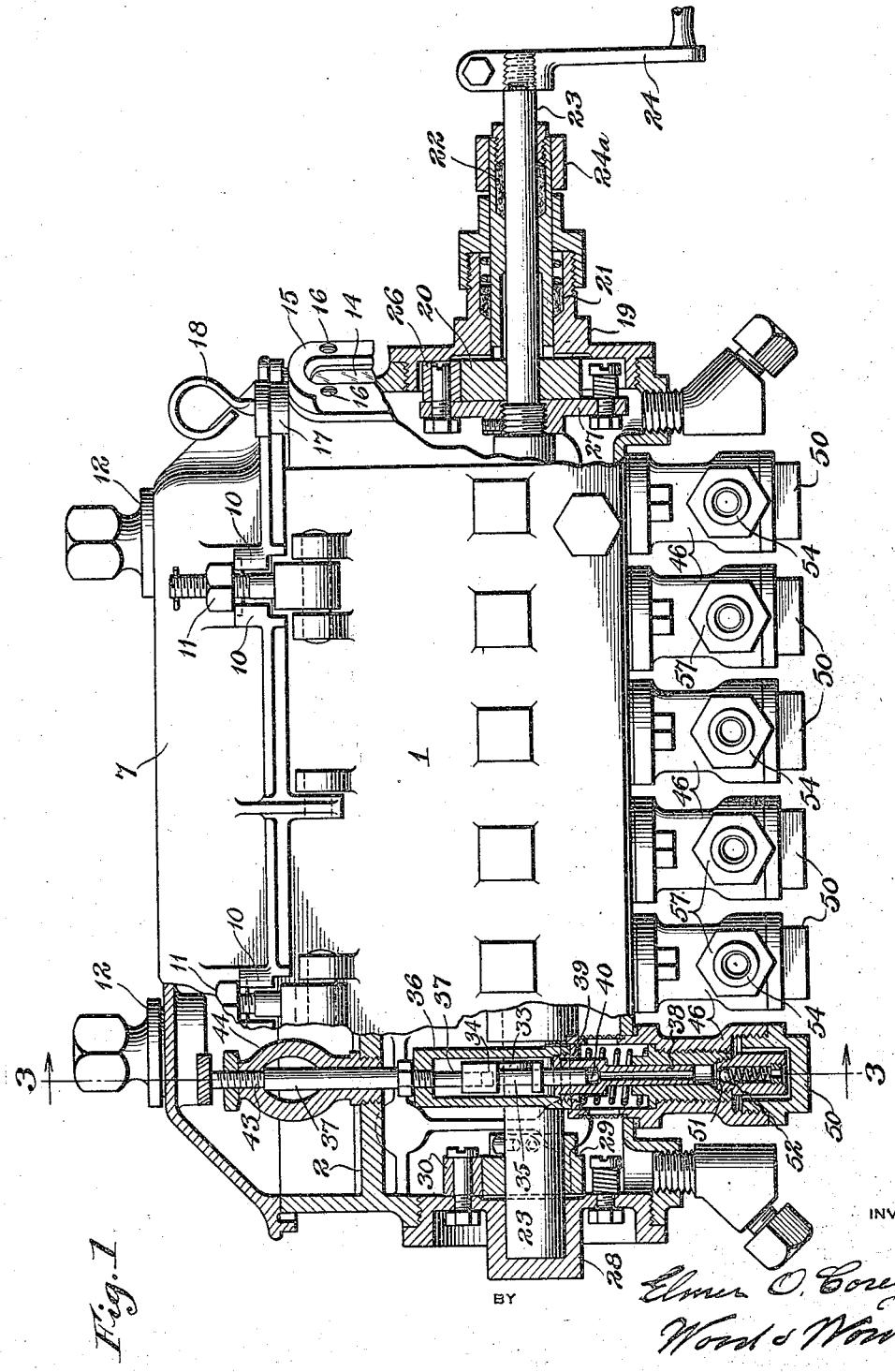
Figure 1 is a side elevation of the lubricator with the opposite end portions thereof in section.
Figure 2:
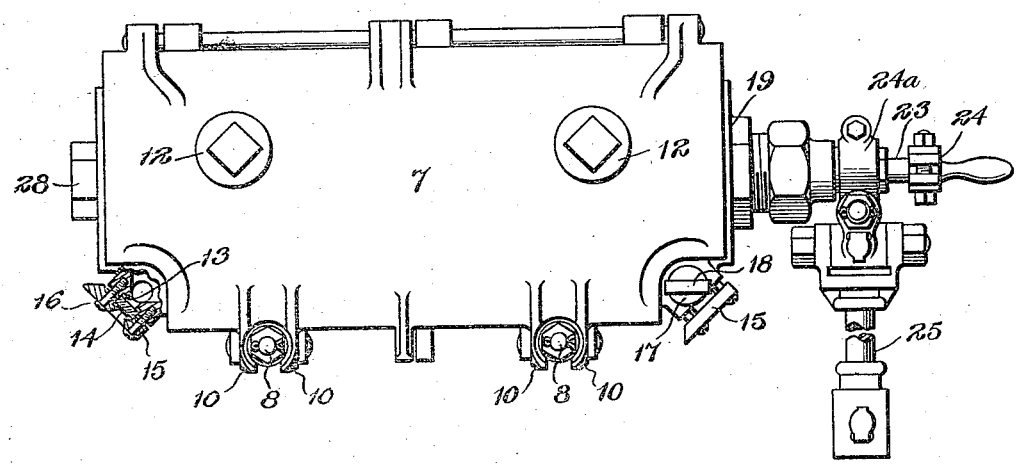
Figure 2 is a top plan view of the same of reduced scale.
Figure 3:
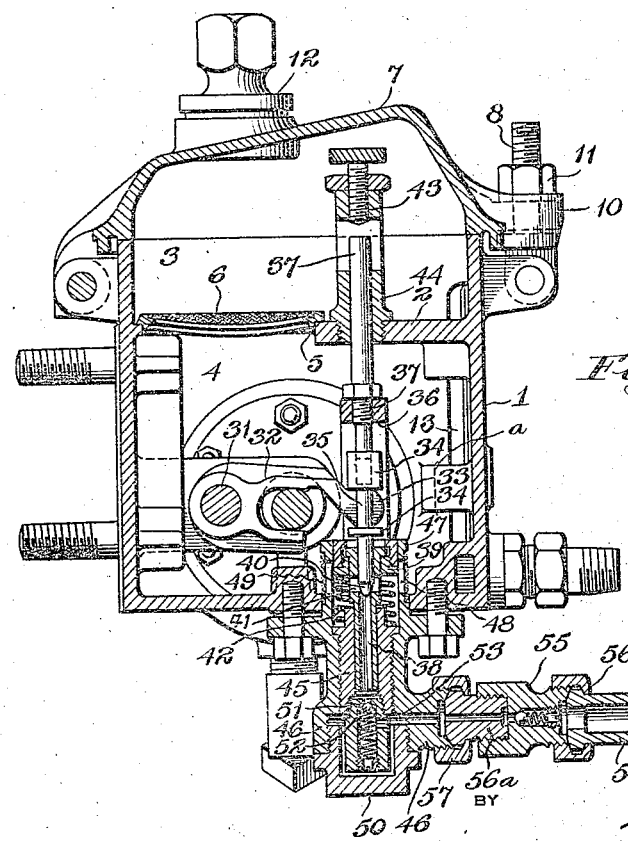
Figure 3 is a central vertical section through the lubricator along line 3—3, Figure 1.

Referring to the drawings, 1 indicates a lubricator body of hollow form to provide a lubricant reservoir of a determined capacity for the number of feed outlets incorporated in the unit. For the lubricator illustrated, six force feed outlets are shown disposed in a line or row extending from the lower or base side of the body and to each of which pipe connections are made for respectively delivering the oil to the various points or parts to be lubricated. The lubricant is forcibly discharged from each outlet in measured or definite quantities by means of a forcer valve and plunger in principle following the type shown and described in Letters Patent to J. W. Grantland, No. 1,484,391, dated February 19, 1924. The forcer mechanism for the several outlets is relatively of duplicate construction and actuated by a common shaft journalled within the body of the lubricant.

The body is approximately of rectangular form in horizontal cross section and interiorly divided by a horizontal septum or web 2, providing a fill chamber 3 immediately above the reservoir portion 4, communicating with the reservoir through one or more openings 5 in the web 2 covered by a screen or strainer 6. A lid or cover 7 provides a closure for the fill chamber hingedly connected to the rear wall of the body and clamped to the body in its closed position by a pair of clamp pins 8—8, each hingedly engaged between lugs extending from the forward side or wall of the body and engaged between lugs 10—10 extending from the forward side of the cover, locked by a lock nut 11 screw-threaded upon the clamp pin 8.

The cover is also provided with one or more fill openings, each sealed by a fill plug 12. The rear side of the body is provided with screw-threaded studs for securing the lubricator in position for use.

The opposite forward corners of the body are provided with sight gages, preferably arranged and set at an angle of 45° and for approximately the entire height of the body to provide a full vision of the reservoir and fill chamber content and for inspection from different angles or from relatively opposite ends of the lubricator.

With the sight gage disposed in the corners of the lubricator, aside from the advantages of visibility, it permits the same to be recessed or set within the rectangular compass of the body without interfering with the capacity of the reservoir and also permits it to be installed for the full height of the body, thus exposing the entire body of oil or lubricant within the reservoir. The sight gage is disposed at a point non-interfering to the outlets or other connections reducing the liability of glass breakage while making pipe connections.

The sight gage structures for each of the forward corners of the lubricator are of duplicate design so that the descriptions will be made in the singular for one corner.

The corner of the body is provided with a vertical oblong opening 13 through the walls, with the face surfaces of the body at opposite sides of the opening at an angle of approximately 45° and recessed longitudinally to receive a sight glass 14 held in place by a frame 15 secured to the body by screws 16. The sight glass marginally is engaged by packing at its opposite sides, bearing against the base surfaces of the recesses in the body and in the frame. The walls of the body about the sight opening are joined by cross struts a interior of the reservoir and integral with the walls. This strengthens the walls and permits the sight opening to extend for the full height of the body.

The body immediately above the sight gage is provided with a plug 17 in place and carrying an oil gage rod 18 extending downwardly into the reservoir and through the fill chamber to the reservoir. The upper end of the gage rod is crooked to provide for a finger hold. The gage rod is thus disposed at a point clear and outside of the lid or cover and, therefore, does not interfere with the opening of the cover, is utilized for obtaining a measured reading of the contents of the reservoir, being provided with gage indications for that purpose, and is capable of being entirely removed from one end of the reservoir and inserted into the other end through the opening in the top of the plug 17 and, therefore, positioned within the most convenient grasp of the attendant.

The opposite end walls of the body are provided with aligned openings each capped by a journal cap. A journal sleeve cap 19 is screw-threaded into the opening of one of the end walls of the body forming a closure for the opening and a journal for the eccentric shaft and ratchet mechanism for driving the shaft.

The inner side of the cap 19 is recessed and houses a ratchet wheel 20 having an extended hub at one side thereof engaged through and journalled in the cap 19, the cap being provided with a stuffing box 21 for sealing about the hub of the ratchet wheel and the hub is provided with a stuffing box 22 for sealing about the eccentric shaft 23 concentrically engaged through the ratchet hub and journalled therein.

The outer end of the shaft 23 has a crank handle 24 fixed thereon for manually rotating the shaft. The ratchet wheel hub at its outer end has a crank arm 24ª adjustably fixed thereon. The free end of the crank arm is pivotally connected to a connecting link 25 for rocking the ratchet wheel, the connecting link being suitably connected to a driving mechanism not shown.

A pawl 26 engaging with the ratchet teeth of the ratchet wheel is pivotally connected to the pawl holder 27 fixed on the shaft for imparting intermittent rotation to the eccentric shaft with each oscillation of the ratchet wheel, the degree of rotation being controlled by the swing of the ratchet arm. The opposite end of the eccentric shaft 23 is journalled in a journal cap 28 screw-threaded into the opening of the opposite end wall, the shaft carrying a reverse ratchet 29 fixed to the shaft engaging with a lock pawl 30 pivoted on the inner side of the cap. A second shaft or rod 31 is supported by bearings suitably cast on back of the body and parallel with eccentric shaft 23 immediately in rear thereof, and may be referred to as a dead shaft, pivotally supports yoke members or pitmen 32, one for each forcer plunger, which is engaged about the eccentric shaft and has a forwardly extending arm 33 engaged between abutments or shoulders 34—34 carried by the valve stem 35 for reciprocating the valve and yoke 36 which guidingly sustains the valve, in each rocking stroke of the yoke member 32.

The yoke 36 guidingly sustains the upper end of the valve rod 35 by means of a guide rod 37 engaged through and fixed to the head of the yoke and extending into a bore in the upper end of the valve rod or abutment 34 thereof.

The valve stem 35 is engaged into the upper end of a tubular plunger 38 carried by and dependingly extended from the yoke 36. The plunger is removably secured to the lower end of the yoke by a sleeve nut 39 screw-threaded into the yoke and engaging against an annular flange of the upper or head end of the plunger. The connection sustains the plunger in a floating position depending from the lower end of the yoke, and free to line with the cylinder. The plunger is counterbored to provide a seat for the valve 40 at the lower end of the stem 35, and the valve when seated provides a head for the tubular plunger.

In an upward stroke of the valve 40 and its stem 35 the plunger 38 and its yoke 36 move therewith by the released pressure of a spring 42 about the plunger 38, and continues therewith until the upper end of the yoke guide stem 37 engages with a stop screw 43 locked to the guide stud 44 screw-threaded into the web 2. The guide stud 44 is thus housed within the fill chamber, and the end of the guide stem 37 normally is on a line or level with the upper edge of the body, thus always clear of the lubricant and within the area of the port hole in the guide stud so as to be always visible and the stop screw 43 adjusted to a definite setting therefrom for regulating the limit of the release or upward stroke of the plunger and its yoke, which determines the plunger displacement and thereby regulates the quantity of lubricant admitted into the plunger when the plunger is uncapped by the valve.

The valve stem 35, after the upward movement of the plunger and its yoke has been arrested, continues with the full throw of the pitman arm 33 for unseating the valve and providing for an open period of the valve for replenishing the plunger supply of the lubricant.

The increased movement of the valve over the plunger allows the valve to unseat so that the lubricant can flow into the tubular plunger through the openings 41 in the head of the plunger in communication with the reservoir supply and the valve closes with the down stroke, and when seated engages the plunger, providing a positive connection between the plunger and pitman arm 33 so that all parts move downwardly as a unit.

The guide stud is generally set to present the port hole visible from the front side of the lubricator, and with the end of the guide stem 37 at all times above the oil level and within the area of the port hole, adjustment of feeds, can be accurately made through regulation of the stop screw 43 toward and from the end of the guide stem. The stop screw is threaded so that one complete turn makes a thirty-second of an inch adjustment.

Definite regulation of plunger stroke and quantity of lubricant discharged for each pressure stroke of the plunger can, therefore, be accurately gaged to meet selected lubrication requirements.

The adjustment and regulation can be made at will and while the lubricator is in operation by opening the lid of the lubricator and resetting the stop screw. By setting the stop screw at its extreme downward position the plunger is thus placed below a point reached by the reciprocating valve. Thus the plunger has no movement and no lubricant will be discharged. This is an advantage in case a pipe should be broken it furnishes a means to stop this particular feed allowing all other feeds to continue as set.

Limiting the movement of the plunger governs its displacement and quantity of lubricant discharged and when set reliably functions as to its measured discharge and is very effective in its operation.

The valve 40 when seated provides a head for the hollow plunger 38 for forcibly discharging a quantity of the lubricant from the plunger bore into the pipe line connected therewith for distribution service. The plunger is slidably and concentrically engaged within a hollow cylinder 45 and screw-threaded within a bore of an L fitting 46 secured to the lower or base wall of the body, with the upper end of the cylinder 45 counterturned to provide a seat for one end of the spring 42 and an annular shoulder for making a sealing joint within the L fitting.

The opposite end of the spring bears against the sleeve nut 39 of the yoke and applies upper tension against the yoke to automatically move the yoke with the upward stroke of the valve stem until positively stopped by the stop screw 43.

The spring is housed within an extended sleeve or hub 47 of the L fitting 46 which extends upwardly from the base wall of the body, and is provided with a plurality of openings 48 therethrough covered by a screen 49 as a band permanently secured within an annular recess in the hub 47. This provides for a non-removing screen which is of advantage in that its omission is not possible after cylinder and plunger renewals have been made, the screen being essential to prevent any sediment deposits from entering the plunger which might interfere with its efficiency of operation.

The lower end of the L fitting 46 is provided with a screw cap 50 housing a check valve nipple or seat 51 screw-threaded into the lower end of the cylinder 45, providing a ported head for the cylinder. The nipple carries a spring pressed ball check valve 52 sealing a port in the nipple, the port being in axial alignment with the bore of the plunger, and when the valve is open is in communication with a lateral passage 53 in the angle nipple extension of the L fitting to which the service line pipe connections are made for delivering the oil to a distant point from the lubricator. The check valve extends beyond the body of the L fitting to make the same accessible when the cap 50 is removed, and in its lower end is a screw forming a removable shoulder for the valve spring to permit of its removal for examination of valve or spring.

The end of the service pipe 54 at the lubricator is arranged to provide for a union coupling connection with the check valve coupling 55 secured to the end of the pipe by union nut 56, the check valve coupling in turn being screw-threaded upon the coupling plug 56$^a$ which in turn has a union coupling connection with the angle extension of the L fitting and held secure thereto by a union nut 57.

The check valve coupling 55, although detachably connected from the end of the pipe 54, remains a permanent part of the pipe system when after being applied and to detach the pipe from the lubricator uncoupling is effective by unscrewing the union nut 57 from the L fitting to provide a check valve control for the end of the pipe when disconnected from the lubricator. This is of advantage as it prevents draining of the pipe line and consequent loss of lubricant when making any renewals to the lubricator or lubricator has been removed for any cause, and also eliminates preliminarily loading the service piping after each disconnection. It is not necessary to refill service pipes by hand cranking or otherwise.

It is obvious, however, that the check valve could be otherwise exposed into the head end of the service pipe, the check valve closing in a direction to prevent draining of the pipe when disconnected from the lubricator and the pipe coupling made directly with the L fitting.

The eccentric shaft 23 extending through the body of the lubricator thus serves and is common to all of the forcer plungers for the number with which the lubricator is provided, except that the eccentric portions are relatively offset or arranged in a relative progressive order about the axis of the shaft so as to operate the plungers in seriatim for a single revolution of the shaft, and thereby more equally distribute the torque upon the shaft and transmission element.

The plunger cylinder 45 being removable from the L fitting can be renewed when occasion requires and is preferably made of steel for extended life. The plunger is slidingly fitted into the cylinder and centered thereto through its detachable connection with the yoke, and with the lower end of the yoke slidably engaged within the sleeve or hub end of the L fitting. Substantial axial alignment of the parts is assured and maintained, so that there is no opportunity for uneven wear of the plunger and cylinder bore.

The plunger and cylinder have a sliding fit of a degree withholding leakage of the lubricant therebetween during the forcer stroke of the plunger, eliminating the use of any packing between the parts. Access to the forcer unit can be conveniently had by merely removing the respective L fitting from the base of the lubricator.

The L fitting carrying the cylinder can be easily slid from the plunger, after which access can be had to the sleeve nut 39 by a socket screw driver, and the plunger removed without disturbing the yoke which is not susceptible to any appreciable wear.

The L fitting while shown pointed to the front may be reversed and pointed the opposite way. This is an advantage as condition may prevent oil pipes from being attached to front of lubricator.

Having described my invention, I claim:

1. In a lubricating device, a reservoir body, a cylinder having a conduit connection at one end thereof, a tubular plunger engaged into the opposite end of said cylinder, open at its head end to the reservoir lubricant supply, a yoke frame connecting with the head end of said plunger and guidingly sustained within said body, a valve member guidingly sustained by said yoke frame and engaged into the head end of the plunger providing a closure for the plunger and a head therefor during the pressure stroke of the plunger, and means for reciprocating said valve, yoke frame, and plunger, said valve unseating in a retreat stroke for opening the plunger and cylinder to receive a lubricant charge and closing in a reverse stroke for forcing the lubricant from said cylinder.

2. In a force feed lubricator, a reservoir body, a forcer cylinder carried by said body having a check valve controlled outlet end, a reciprocal tubular plunger concentrically engaged into the opposite end of the cylinder, a reciprocal valve providing a closure for the head end of said plunger, said valve and plunger movable independently in a retreat stroke, adapting the valve to unseat and admit the lubricant into said plunger, said plunger and valve moving unitarily for a part of a reverse or pressure stroke, the valve closing said plunger and providing a head therefor for forcing the fluid from the cylinder, the retreat stroke of the plunger regulatably controlled for varying the fluid displacement.

3. In a force feed lubricator, a reservoir body, a tubular fitting removably secured to said body and adapted for making a lubricant distributor service pipe connection thereto, a cylinder removably secured in said fitting having a check valve removably secured in one end thereof and providing a discharge head therefor, a reciprocal tubular plunger concentrically engaged into the opposite end of said cylinder, a reciprocal valve providing a closure and head for said plunger, a yoke guidingly sustained in said body removably carrying said plunger, and means for reciprocating said valve, the valve in a retreated stroke unseating from the tubular plunger for admitting the lubricant into the plunger and cylinder, and in an opposite stroke seating to close the tubular plunger and moving the same for forcing the lubricant from the cylinder.

4. In a force feed lubricator, a reservoir body, a tubular fitting removably secured to said body and adapted for making a lubricant distributor service pipe connection thereto, a cylinder removably secured in said fitting having a check valve removably secured in one end thereof and providing a discharge head therefor, a reciprocal tubular plunger concentrically engaged into the opposite end of said cylinder and spring impelled in one direction, a reciprocal valve providing a closure and head for said plunger, a yoke guidingly sustained in said body removably carrying said plunger, adjustable means for limiting the retreat stroke of said yoke and plunger governing the plunger displacement, and means for reciprocating said valve in one direction for unseating the valve and admitting the lubricant through the plunger into the cylinder and for moving said valve to close the plunger and move the same therewith in a pressure stroke for forcing the fluid from the cylinder.

5. In a pressure lubricating device, a reservoir body, a lubricant delivery unit comprising a tubular member removably connected to the body and adapted for making service pipe connections, a cylinder concentrically secured within said tubular member having a check valve control discharge end, a yoke having one end slidably engaged into said tubular member and its opposite end guidingly sustained within said body, a tubular plunger slidable within said cylinder having its head end secured to said yoke, said yoke and plunger being spring impelled in a retreat stroke, a valve guidingly sustained by said yoke and engaged into said plunger providing a closure head for the plunger, said valve and plunger having different length retreat stroke for unseating the valve and admitting a supply of lubricant from the reservoir through the plunger into the cylinder and the valve moving the plunger in a pressure stroke after the valve is closed for forcibly discharging a quantity of the lubricant from said cylinder, and means for reciprocating said valve.

In witness whereof, I hereunto subscribe my name.

ELMER O. COREY.